United States Patent [19]

Kuriyama et al.

[11] Patent Number: 4,839,875
[45] Date of Patent: Jun. 13, 1989

[54] TECHNIQUE FOR AUTOMATIC TRACKING OF CASSETTE RENTALS AND MANAGING OF INFORMATION RELATED THERETO

[75] Inventors: Zenkichi Kuriyama; Masaho Aoba, both of Sagamihara; Teruo Takeuchi, Ichikawa, all of Japan

[73] Assignees: Anritsu Corporation; Yuasa Shoji Co.; Dan Co., Ltd., all of Tokyo, Japan

[21] Appl. No.: 50,711

[22] Filed: May 14, 1987

[30] Foreign Application Priority Data

May 19, 1986 [JP] Japan .............................. 61-73980[U]
Oct. 23, 1986 [JP] Japan ................................. 61-252297
Oct. 23, 1986 [JP] Japan ................................. 61-252298

[51] Int. Cl.$^4$ ....................... G06F 15/24; G06K 19/06
[52] U.S. Cl. ....................................... 369/14; 235/381; 235/375; 235/385; 360/132; 360/137; 369/33; 364/401
[58] Field of Search ............... 235/375, 376, 377, 380, 235/381, 383, 385, 419, 492, 432, 488, 487; 340/825.35; 364/401, 402, 403, 410, 478, 479; 369/14, 33, 34, 30; 360/132, 137, 91, 92, 96.5; 371/66

[56] References Cited

U.S. PATENT DOCUMENTS

| | | | |
|---|---|---|---|
| 4,338,644 | 7/1982 | Staar | 360/137 |
| 4,369,442 | 1/1983 | Werth et al. | 364/479 |
| 4,414,467 | 11/1983 | Gould et al. | 235/381 |
| 4,426,684 | 1/1984 | Sechet et al. | 364/900 |
| 4,458,802 | 7/1984 | Maciver et al. | 235/381 |
| 4,575,621 | 3/1986 | Dreifus | 235/492 |
| 4,593,337 | 6/1986 | Leone et al. | 360/137 |
| 4,598,810 | 7/1986 | Shore et al. | 235/381 |
| 4,636,634 | 1/1987 | Harper et al. | 235/385 |
| 4,654,800 | 3/1987 | Hayashi et al. | 364/403 |
| 4,679,150 | 7/1987 | Hayashi et al. | 364/479 |

FOREIGN PATENT DOCUMENTS 56-161202 12/1981 Japan .
57-4802 1/1982 Japan .
57-38198 3/1982 Japan .
58-216802 12/1983 Japan .

OTHER PUBLICATIONS

Movie Mart Video Rental System brochure, copyright 1984.
Video Vendor Video Cassette Renting Machine, 1986.
Creditron Video Tape Rental and Sales System brochure.

Primary Examiner—Alan Faber
Assistant Examiner—Robert A. Weinhardt
Attorney, Agent, or Firm—Frishauf, Holtz, Goodman & Woodward

[57] ABSTRACT

A rental control system for controlling the rent and return of cassettes is disclosed. Each cassette internally contains an article such as a recorded information medium, with an IC circuit for storing commodity information concerning the article, and a signal output unit for transferring the commodity information of the IC circuit to outside. For controlling the cassettes, the rent control system further comprises a plurality of shelves and a controller. The plurality of shelves respectively accommodate the cassettes to be controlled. The controller is provided in connection with the plurality of shelves, and includes a plurality of signal input unit for receiving signals from the signal output units of the cassettes, and a memory coupled with the control circuit so as to store signals from the plurality of signal input units.

17 Claims, 11 Drawing Sheets

FIG. 9

| SHELF NO. | COMMODITY INFORMATION ⟨63⟩ ||| RENT INFORMATION ⟨64⟩ |||||
|---|---|---|---|---|---|---|---|---|
| ⟨62⟩ | CODE | BRANCH NO. | TITLE | PRICE | TIMES | SUM | ARREARS | DATE | MEMBER'S NO. |
| 5 | | | | | | | | | |
| 107 | | | | | | | | | |
| 61 | | | | | | | | | |
| | | | | | | | | | |
| | | | | | | | | | |
| | | | | | | | | | |
| | | | | | | | | | |

⟨59⟩  ⟨60⟩

| NUMBER OF DAYS RENTED ⟨65⟩ | ARREARS ⟨66⟩ |
|---|---|

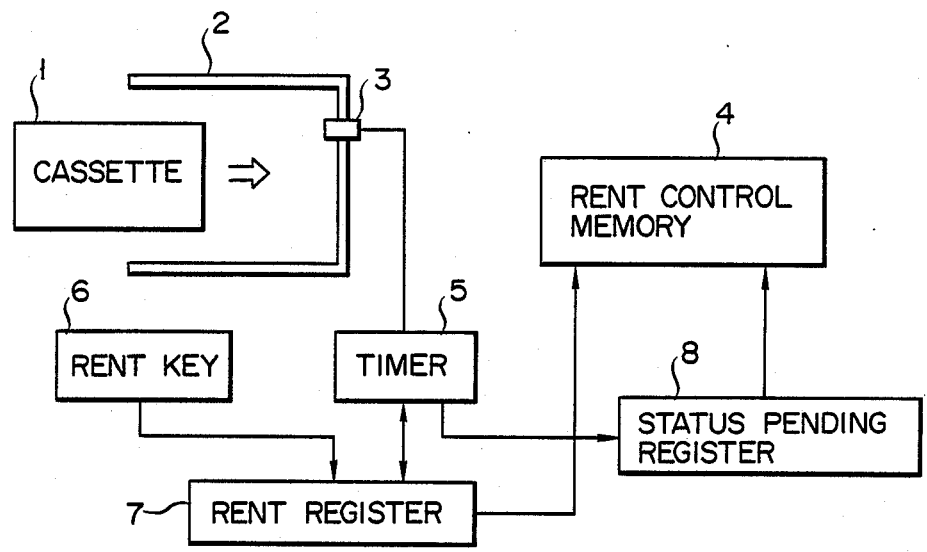
F I G. 11
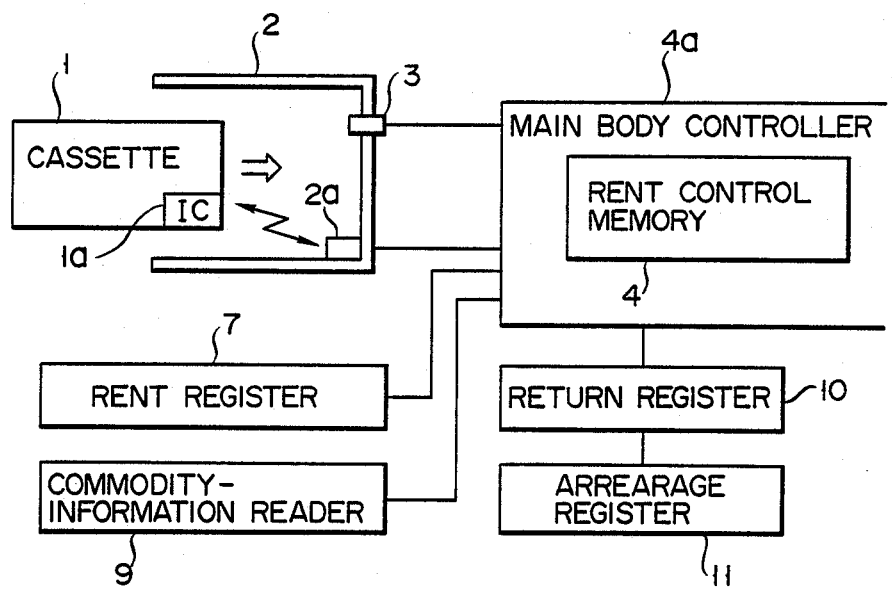
F I G. 12

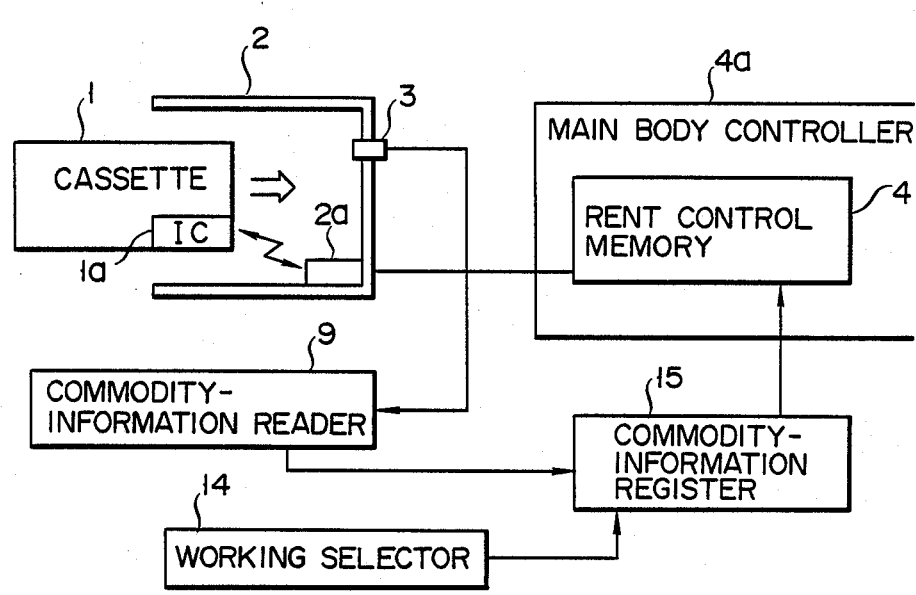
F I G. 15
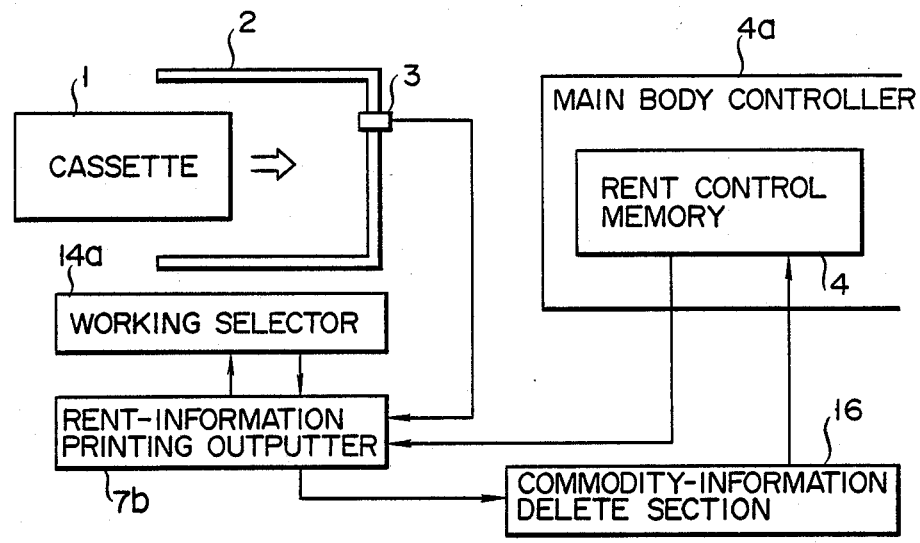
F I G. 16

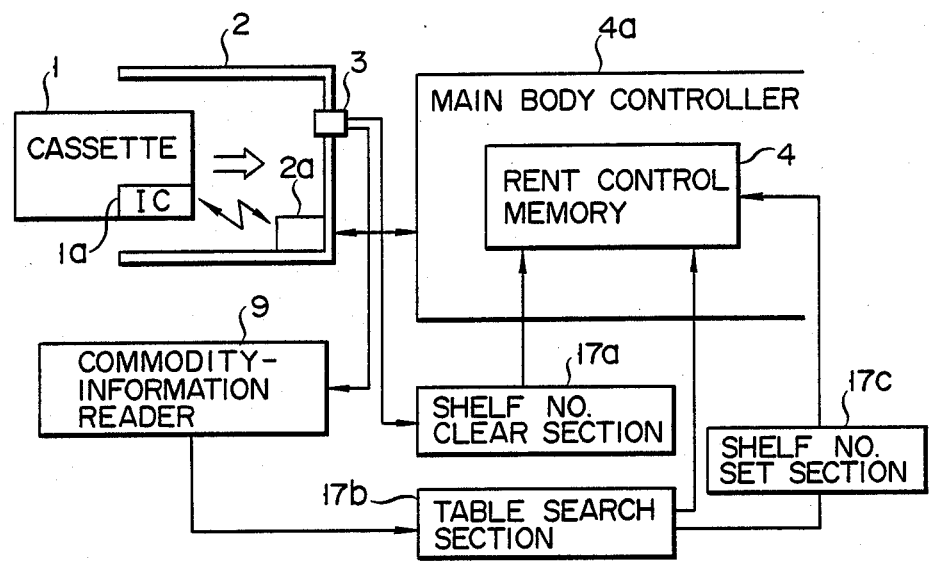
F I G. 17
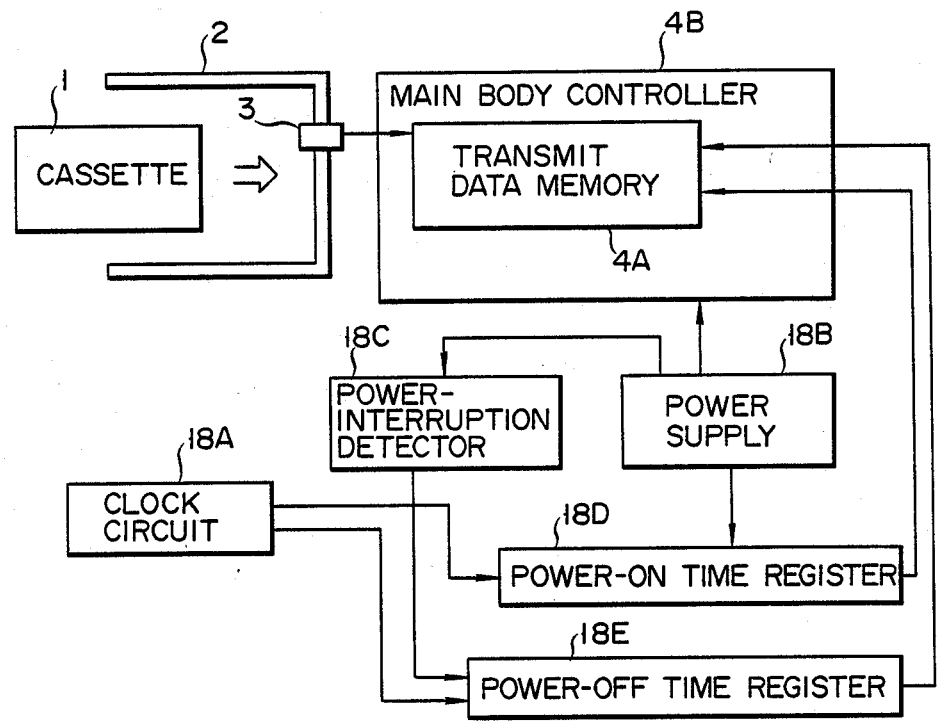
F I G. 18

4,839,875

TECHNIQUE FOR AUTOMATIC TRACKING OF CASSETTE RENTALS AND MANAGING OF INFORMATION RELATED THERETO

BACKGROUND OF THE INVENTION

This invention relates to a cassette and cassette-rent control system, for example, utilizing the states of cassettes, such as the rent and return of cassettes, and more particularly to a rent control system for controlling the rent and return of cassettes, each containing an article such as an information-recorded medium and an IC circuit storing the commodity information concerning the article.

In rental shops for renting video tapes and video discs to the public, a clerk records, on a notebook or a rental slip, various necessary information, such as the name or the code of a rental article, the address and the name of a customer, and the rental date before renting articles, such as video tapes. When receiving the returned rental article, the clerk erases the rental records. Such recording work of rental information by the clerk reduces the efficiency of his rental work. Further, mistaken operations are inherent to such recording work, since it is performed manually. For example, he or she may fail to erase the recorded information when receiving the returned rental article.

Software rental companies for renting rental articles to the public must pay to the software suppliers, such as recording, TV and motion picture companies, a royalty which is calculated depending on the number of rentings. Therefore, the rental company must accurately control the renting work, at least the number of articles rented. Thus, if the conventional rent control is performed by manual work, it is almost impossible to accurately and quickly control the rental articles.

To cope with this, there is proposed a software rent control system. In this system, a bar code representing an article code is attached to each cassette tape. Membership cards are issued to customers, bearing the numbers assigned to them. In renting an article to a customer, the clerk reads out the bar code of the article by a bar-code reader, and stores into a memory device the bar codes together with the the customer's number.

However, this rent control system still involves problems in the rent control work. In the rent control system, the article code of cassette, which is being rented, have been stored in the memory device. To see how many times the cassette has been rented, it is sufficient to read and print out the contents stored in the memory. In this case, the clerk must read the bar codes of the cassettes every time they are rented or returned.

Additionally, the memory device does not contain such data indicating whether or not the unrented cassettes have been set in the shelf. Therefore, in checking inventories at the end of month or at the end of day work, the clerk must carefully check and itemize the stocked cassettes. This work is time consuming, and the results of the work are inevitably accompanied by inexactness.

SUMMARY OF THE INVENTION

It is, therefore, an object of this invention to provide a new and improved cassette and rent control system thereof, which can exactly and easily control the rent and return of cassettes.

According to one aspect of this invention, there is provided an information recording cassette comprising cassette means accommodating an article, IC circuit means provided in the cassette means, for storing commodity information concerning the article, and signal output means provided in the cassette means, for transferring the commodity information stored in the IC circuit means to outside.

According to another aspect of this invention, there is provided a rent control system for controlling the rent and return of cassettes. This system comprises a plurality of cassettes to be controlled, each containing an article, and being provided with IC circuit means for storing commodity information concerning the article, and signal output means for transferring the commodity information stored in the IC circuit means to outside, a plurality of shelf means for respectively accommodating a plurality of the cassettes to be controlled, and control means provided in connection with the plurality of shelf means, and having a plurality of signal input means for receiving signals from the signal output means of the cassettes, and memory means being coupled with the control means so as to store signals from the plurality of signal input means.

In the cassette thus arranged, if a cassette holder shelf is provided with terminals, which are electrically connectable by signal output units to the IC circuits of the cassettes, the article data stored in the IC circuits provided in the cassettes can be read out by an external controller. Therefore, the rent and return of cassettes can be controlled exactly and easily.

In the rent control system, the IC circuit for storing the article such as the tapes of cassettes is incorporated in the cassette. Therefore, the article information stored in the IC circuits can be read out at any time, while the cassettes are left on the cassette holder shelf. If a cassette is pulled out from the shelf, the rental information of the pulled out cassette is automatically stored into the rental control memory. When the cassette is returned and set on the shelf, the cassette return information is automatically stored into the rental control memory. Thus, when the cassettes are pulled out of, and put on, the shelf, the rent and return data are automatically stored into the memory device. Therefore, the easy and exact rent/return control of cassettes is realized.

BRIEF DESCRIPTION OF THE DRAWINGS

These and other objects and features of this invention can be understood through the following embodiments by reference to the accompanying drawings, in which:

FIG. 9 is a view showing contents of a rent control memory of the main body controller;

FIG. 11 is a block diagram showing a second embodiment of the invention;

FIG. 12 is a block diagram showing a third embodiment of the invention;

FIG. 15 is a block diagram showing a sixth embodiment of the invention;

FIG. 16 is a block diagram showing a seventh embodiment of the invention;

FIG. 17 is a block diagram showing an eight embodiment of the invention;

FIG. 18 is a block diagram showing a ninth embodiment of the invention.

DETAILED DESCRIPTION OF THE PREFERRED EMBODIMENTS

Some specific embodiments of this invention will be described referring to the accompanying drawings.

Figure 2:
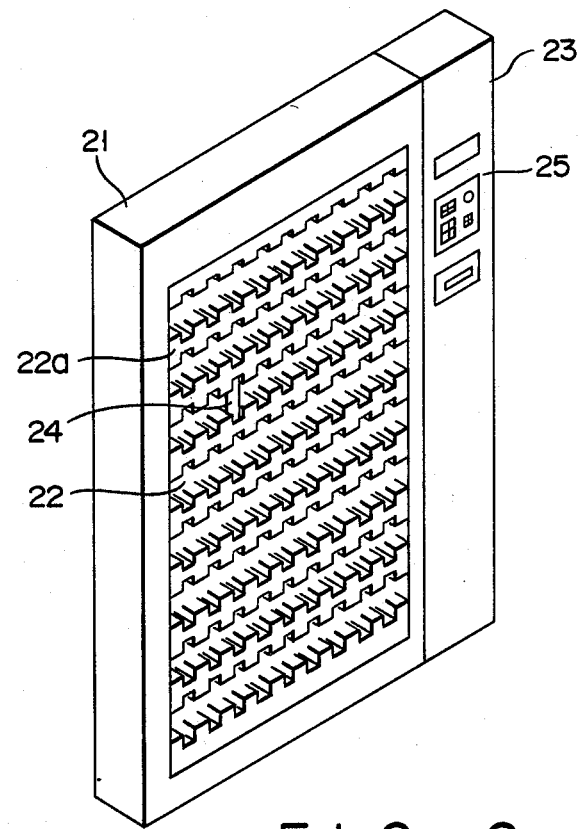
FIG. 2 shows a perspective view illustrating an overall rent control system.

Referring first to FIG. 2, there is illustrated a rent control system using a cassette control system, which is a first embodiment of this invention. In this embodiment, the rent control system is installed in a video rental shop for renting video tapes, or the like, to the public. In the figure, reference numeral 21 designates a rack with a number of shelves 22 on the front. Main body controller 23 is installed adjacent to rack 21, operation panel 25 covers the front of main body controller 23.

Figure 3:
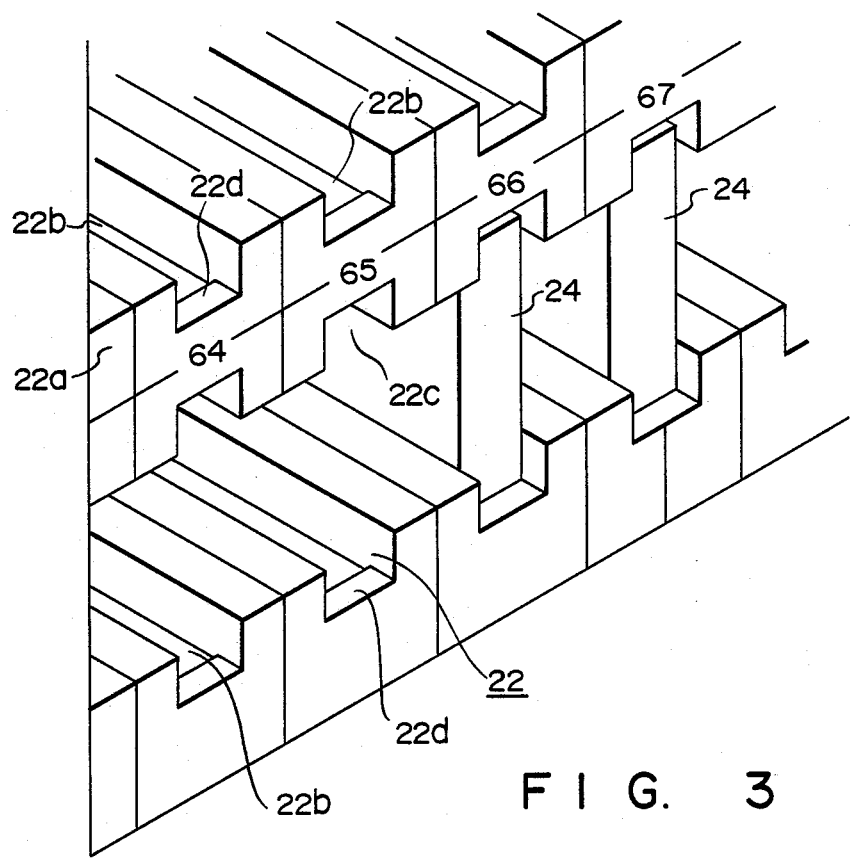
FIG. 3 shows a perspective view of a part of the rent control system of FIG. 2.
Figure 4:
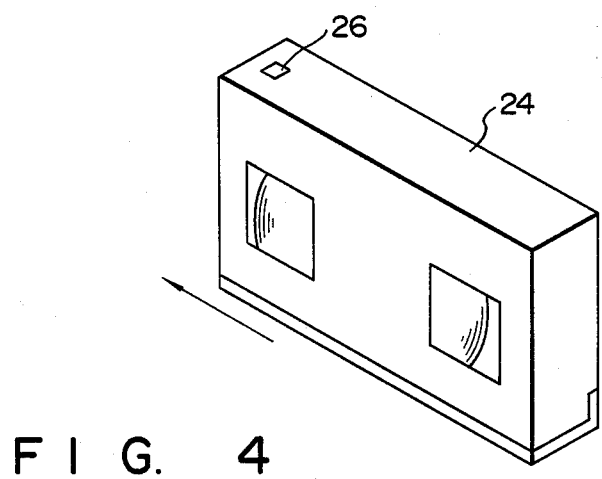
FIG. 4 shows a perspective view of a cassette.

Each shelf 22 mounted to rack 21 includes a plurality of ledges 22a arranged on the front of rack 21, horizontally and in parallel, as shown in FIG. 3. A pair of guide grooves 22b and 22c are respectively formed on the upper and lower surfaces of each ledge 22a. The lower guide groove 22b has stepped portion 22d for preventing the cassette from slipping off. Stepped portion 22d rises at the front of the lower guide groove 22b. In use, a cassette 24 of the video tape shown in FIG. 4 is set between opposing guide grooves 22b and 22c, in the longitudinal direction (arrow direction). When cassette 24 is fully inserted along guide grooves 22b and 22c, the whole of cassette 24 passes stepped portion 22d and is placed in the horizontal section of guide 22b. To pull out the cassette, the end of cassette 24 closer to stepped portion 22d is slightly raised, and pulled to your side.

Figure 1:
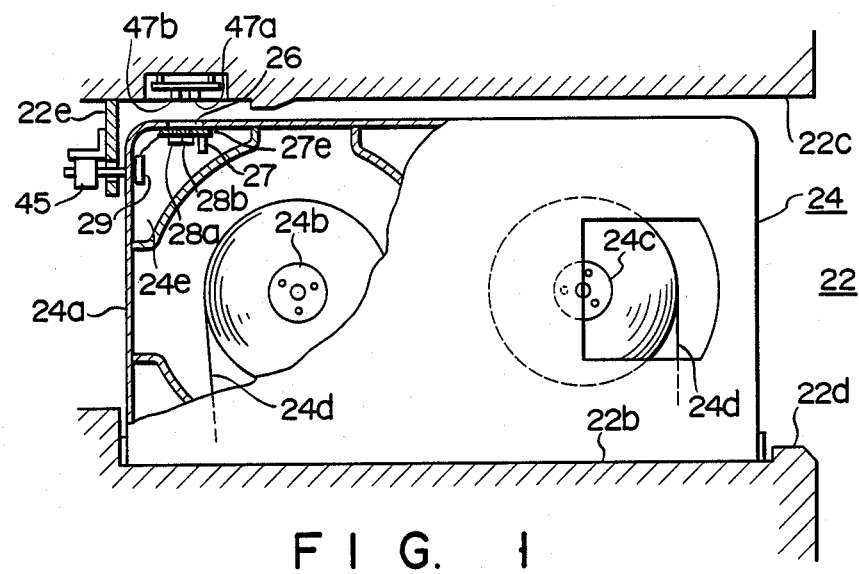
FIG. 1 shows a partial cross sectional view of a cassette being set in the shelf.

FIG. 1 shows in cross sectional form cassette 24 which is left inserted into shelf 22, and placed in the prescribed position. A pair of reels 24b and 24c are disposed in cassette case 24a shaped like a parallelepiped. Tape 24d is wound around reels 24b and 24c. Window 26 is formed in the corner enclosure 24e of cassette case 24a, through which an optical communication is allowed. In corner enclosure 24e, IC circuit 27 is disposed facing window 26. Printed circuit (PC) board 27e supporting IC circuit 27 is attached to the inner surface of cassette case 24a. Disposed on PC board 27e are light emitting element 28a and photodetector element 28b, which constitute a signal output unit. Through holes are formed in PC board 27e at the location thereof, facing the light emitting surface and the light receiving surface of those elements. Battery 29 is provided adjacent to PC board 27e. These electronic parts are located within the corner enclosure 24e of cassette case 24a, thus not hindering the running of the tape.

As shown in FIG. 1, when cassette 24 is inserted into shelf 22 until it is placed at the regular position, light emitting element 47a and photodetector element 47b are provided in the upper groove 22c and face the window 26 of cassette frame 24a. Microswitch 45 is mounted on the wall 22e of the shelf 22. When cassette 24 is inserted into shelf 22 up to the prescribed position, microswitch 45 is closed.

Figure 5:
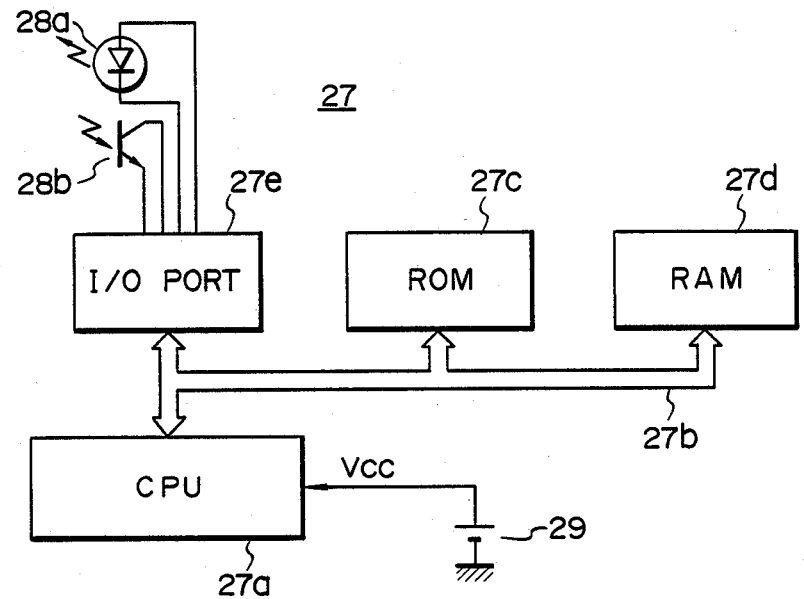
FIG. 5 shows a block diagram of an IC circuit assembled into the cassette.
Figure 6:
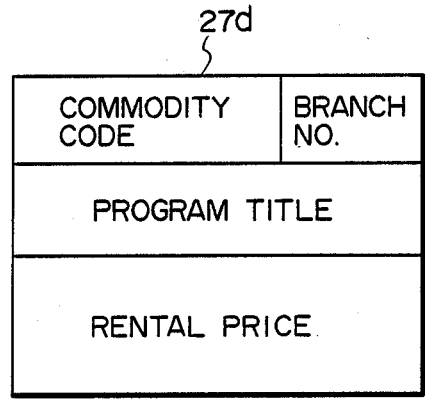
FIG. 6 is a view showing commodity information stored in a memory in the IC circuit

FIG. 5 is a block diagram illustrating IC circuit 27. Central processing unit (CPU) 27a is connected by bus line 27b to read only memory (ROM) 27c, random access memory (RAM) 27d, and input/output (I/O) port 27e. I/O port 27e is connected to light emitted device 28a and photodetector element 28b. RAM 27d stores commodity information including a commodity code of the video tape, a branch No, a program title (of the cassette), and a rental price, as shown in FIG. 6. The branch No. is used when there are a plurality of identical commodities. The rental price means a fee for renting one time. The commodity information has been written in at the external video software control center. The cassette 24 with the commodity information written in is supplied to the video rental shop.

Figure 7:
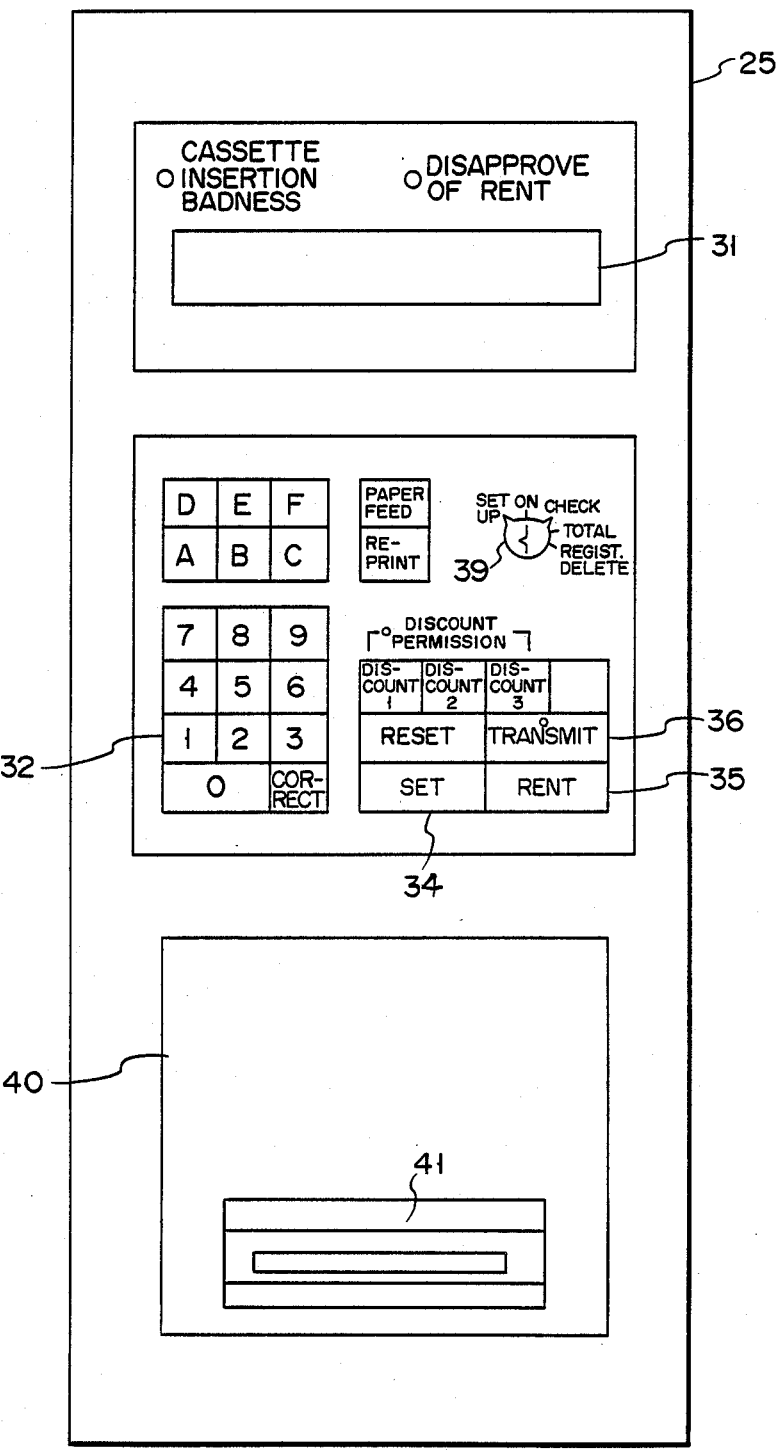
FIG. 7 shows a layout on the operation panel of the rent control system according to this invention.

As shown in FIG. 7, operation panel 25 includes display 31, numeric keys 32, set key 34, rent key 35, transmit key 36, mode selector 39, and outlet 41 of printer 40. Display 31 displays various messages and an amount of money. Numeric keys 32 are for entering numeric data such as a member's number. Set key 34 is used for setting the numeric data entered. Rent key 35 is pressed when a cassette is rented. Transmit key 36 is for transmitting data to a host computer installed at the external video software control center. Mode selector 39 is operated by a key for selecting various working modes. Printer 40 prints a rental vote.

Figure 8:
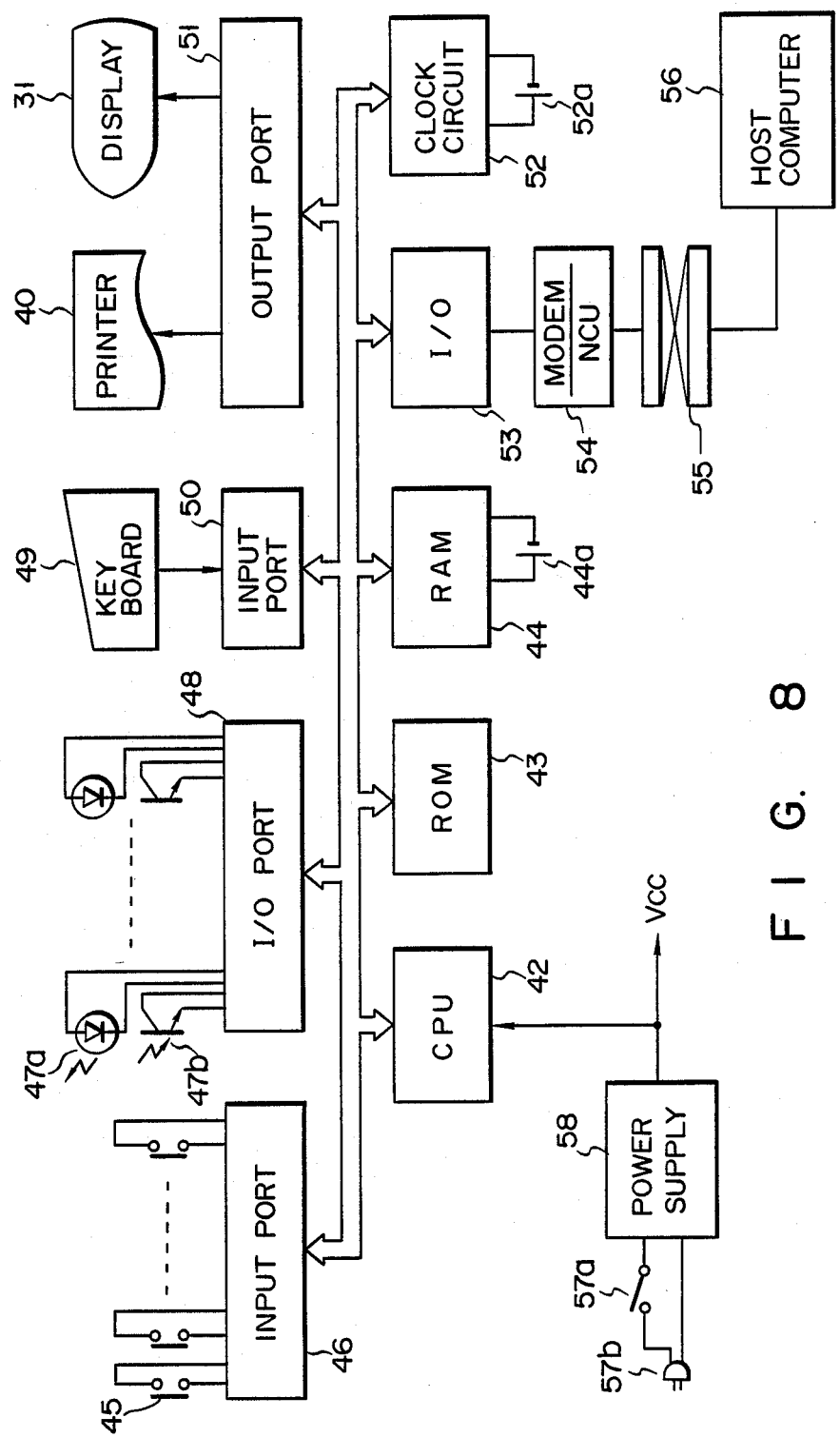
FIG. 8 is a block diagram of the main body controller used in the rent control system according to this invention.

FIG. 8 is a block diagram illustrating main body controller 23. A bus line connects CPU 42 controls ROM 43, RAM 44, input port 46, I/O port 48, input port 50, output port 51, clock circuit 52, and I/O interface 53. On/off data provided by operating micro switch 45 mounted in each shelf 22 is input to input port 46. I/O port 48 is connected to light emitted device 47a and photodetector element 47b, both mounted inside lower guide groove in shelf 22. A key-in signal is input to input port 50 from keyboard 49 on operation panel 25. Output port 51 transfers data to printer 40 and display 31. Clock circuit 52 counts the present date and time. I/O interface 53 is for transferring data such as rental data. I/O interface 53 is connected to host computer 56 by modulator/demodulator (MODEM) 54 and exchanger 55.

A drive voltage Vcc from power supply 58 is supplied to the above electronic members. Power supply 58 is connected to an AC power source (not shown) by power switch 57a and power plug 57b. In RAM 44 and clock circuit 52, the memory contents and the clocking operation are always kept by backup batteries 44a and 52a, respectively, irrespective of power outage.

RAM 44 includes rent control memory 59, as shown in FIG. 9. Rent control memory 59 consists of tables 60. The number of tables 60 corresponds to that of shelves 22 of rack 21. Each table 60 has shelf number area 62, commodity information area 63, and rent information area 64. The numbers of shelves 22 are stored in shelf number area 62. Commodity information including commodity code, branch number, title, and rental price, is stored in commodity information area 63. Rent information is stored in rent information area 64. Rent information includes the total number of rentings of articles, the total amount of rental fee, the total amount of arrears, and the rent date of article and the member's number of a customer, i.e., a member, when the article is rented. When the tape is rented, the number of shelf number area 62 is cleared.

RAM 44 further includes number of day rented memory 65 and arrears memory 66. Number of days rented memory 65 stores the number of rented days for one rent. When an article is returned after the expiration of the rent term, the arrears, the amount of money or percentage, per day is stored into arrears memory 66.

Figure 10:
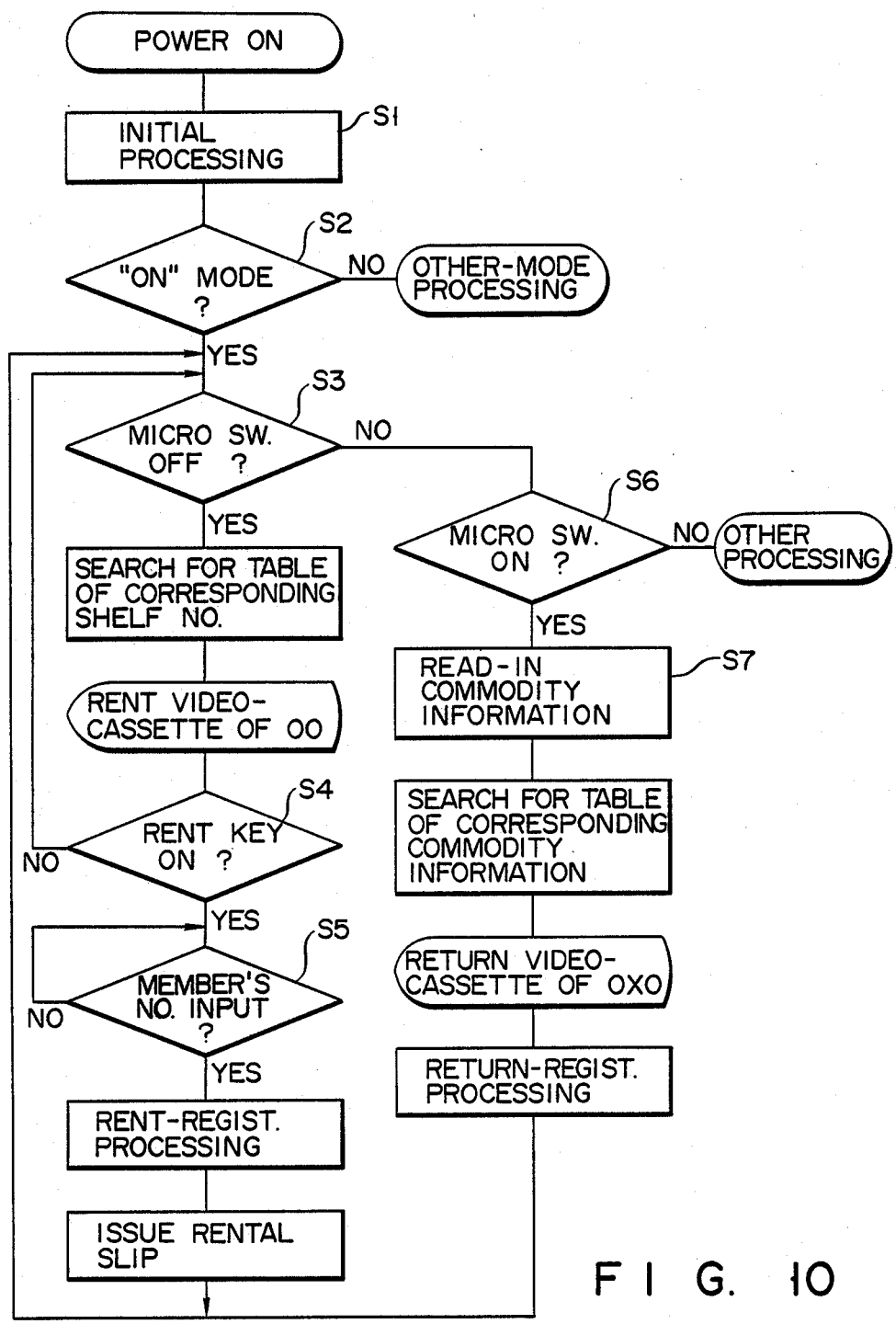
FIG. 10 shows a flowchart illustrating a flow of operation of the rent control system.

Main body controller 23 of the above cassette rent control apparatus performs the rent/return processing of each cassette 24, in accordance with a flow chart of FIG. 10. When power switch 57a is turned on, a predetermined initial processing including clearing various I/O ports and I/O interface is executed in step S1. In step S2, the controller confirms that mode selector 39 on operation panel 25 is set to the [ON] position where the normal work such as renting and returning work of articles is performed.

When micro switch 45 of shelf 22 is open in step S3, shelf number area 62 of each table 60 of rent control memory 59 of RAM 44 is searched for, because the opening of the micro switch 45 indicates that the cassette 24 has been pulled out from shelf 22. Upon searching the shelf number, the present date and time are read out from clock circuit 52, and are stored, as the rent data and time, in rent information area 64 of table 60. The number of shelf number area 62 of table 60 is cleared. At the same time, the title of the video tape, which has been read out from commodity information area 63 of table 60, is displayed by display 31.

In step S4, rent key 35 is operated, and in step S5, a member's number of a customer is entered by numeric keys in step S5. The rent information, such as the total number of rentings, and the total rental amount, which are stored in the rent information area 64 of table 60 for the pulled out cassette, are updated. At the same time, the entered member's number is stored. The commodity information, and the rent information, which includes the rented data and time, the member's number and rent date for each cassette, is printed out on a rent slip by printer 40, and the printed rent slip is ejected from outlet 41. At this point, the rent processing for one customer is completed. The control flow returns to step S3.

In step S3, no cassette 24 is pulled out shelf 22. In step S6, if micro switch 45 of shelf 22 having held no cassette 24 is closed, it is decided that cassette 24 returned by a customer is inserted in shelf 22. The number of shelf 22 is read out in step S7. The commodity information is read out from RAM 27d IC circuit 27 of the inserted cassette 24. By the commodity code contained in the read out commodity information, the commodity information areas 63 of table 60 of rent control memory 59 is searched. At the same time, the title of the video tape contained in the commodity information, which has been read out from IC circuit 27, is displayed by display 31.

When the commodity code is searched, the shelf number as previously read out, is stored in the shelf number area 62 of the table 60. The article return is registered in the rent information area 64 of table 60. In other words, the rent date and time, and the member's number in rent information area 64 are cleared. The return processing of one cassette 24 ends here. CPU returns to step S6, and waits for insertion of the next cassette 24.

In this cassette rent control apparatus, when mode select key 39 is set to the on-position, and cassette 24 is pulled out of shelf 22, the rent of cassette 24 is stored in rent control memory 59. When cassette 24 is inserted into shelf 22, the return of that cassette 24 is stored in rent control memory 59.

With this feature, the clerk does not have to perform special operations for rent and return. He inserts and pulls out cassette 24 in and from shelf 22. This greatly improves the efficiency of the clerical works for rent and return.

Further, it is possible to determine whether or not cassettes 24 are inserted in respective shelves 22, either directly by microswitches or by reading out the data of IC circuit 26 by the light emitting element and the photo detector element. This makes it possible to monitor the stock accurately at all times.

Since IC circuit 27, which stores the commodity information of the video tape, is assembled into rental cassette 24 when cassette 24 is returned to shelf 22, the commodity information of the returned cassette can be automatically read out by main body controller 23, through the combination of the light emitting element and the photo detector element. This makes it possible to know accurately the commodity information such as the commodity code of returned cassette 24. Therefore, there is no need for specifying shelf 22.

Since electronic components, such as IC circuits and the light emitting element 28a as the signal output device, as the signal output device, and photodetector element 28b are small enough to be installed in corner enclosure 24e formed in the corner of the cassette, they will never obstruct the running of the tape.

It should be understood that this invention is not limited to the above-mentioned embodiment. In the embodiment, RAM 27d of IC circuit 27 of cassette 24 only stores commodity information such as commodity codes and titles. Alternatively, such information may also be stored in cassette 24. In that case, when cassette 24 is pulled out of self 22, CPU 27a of IC circuit 27 writes rent information into RAM 27d. When cassette 24 is inserted into shelf 22, CPU 27a writes return information into RAM 27d. The rent control memory 59 in main body controller 23 can be omitted since cassette 24 stores the information. The rent information of each cassette 24 is directly transferred to host computer 56.

As described above, in the first embodiment of this invention, an IC circuit for storing the commodity information of the recording information medium, is assembled into cassette 24. By using the commodity information stored in the IC circuit, accurate rent control can be easily realized.

In the first embodiment of the rent control system, the commodity information of the IC circuit of the cassette set in the shelf can be externally read. Therefore, efficiency of the cassette rent and return operations can be greatly improved. Also, exact cassette rent control can be executed.

In the description of other embodiments, in which only the key portions of them will be given, the drawings of the first embodiment and the description thereof will be used whenever necessary.

A schematic illustration of a rent control system, which is a second embodiment of this invention, is given in FIG. 11. The system is comprised of a plurality of shelves 2, detector 3, rent control memory 4, and timer 5. Articles to be rented, such as cassettes are individually set into shelf 2. Detector 3, which is installed in each shelf, is for detecting the insertion of each article into the shelf. Rent control memory 4 includes a plurality of tables for respective rent articles. Each of the tables has a commodity information area for storing the commodity information of the associated article, a rent information area for storing rent information, and a shelf number area for storing the number of shelf associated with the article. Timer 5 measures the allowance time elapsed from the instant that the article is pulled out the shelf.

When rent key 6 is operated before timer 5 counts a predetermined allowance time, rent information is registered in the rent information area in the table, which is associated with the number of the shelf from which the article has been pulled out. When timer 5 completes the counting of the allowance time, supposition rent information is registered in the rent information area of the table, which is associated with the shelf number of shelf 20 from which the article was pulled out. This is realized by the status-pending register 8.

If the rent control system thus arranged is used, the presence or absence of the article of each shelf is monitored by detector 3. The commodity information of each article set in the shelf, the shelf number and the rent information, are stored into each table. When an article is pulled out from the shelf for rent, timer 5 starts measuring time. When rent key 6 is pushed before timer 5 starts measuring time, rent information is registered into the rent information area of the table as specified by the shelf number of the shelf from which the article was pulled out. When rent key 6 is not pushed, and timer 5 measures a predetermined allowance time, the supposition rent information is registered into the rent information area for that article.

As described above, in the second embodiment, the rent control memory is used to store the rent information of each article. When a predetermined time elapses after a rental article is taken out of the shelf, the article taken out is supposed to have been rented and is registered into the supposition rent register. This embodiment realizes simplification of the renting operation of the article, and an exact rent control.

A third embodiment of a rent control system according to this embodiment is illustrated in FIG. 12. As shown, the rent system comprises IC circuit 1a, a plurality of shelves 2, detector 3, rent control memory 4, main body controller 4a, signal transfer unit 2a, rent register, commodity information reader 9, return register 10 and arrearage register 11. IC circuit 1a is assembled into article 1 to be rented for pay, such as a cassette, and stores the commodity information of the article. Articles are individually set into the shelf. Detector 3 detects the insertion of the article into the shelf, and is installed in each shelf. Rent control memory 4 stores a plurality of tables for articles 1. Each table 1 has a commodity information area for storing the commodity information of article 1, an rent information area for storing rent information, and a shelf number area for storing the shelf number. Main controller 4a executes the read/write operation of various types of information for rent control memory 4. Signal transfer unit 2a is used to transfer data transfer between IC circuit 1a and main controller 4a when article 1 is left inserted in shelf 2. After detector 3 detects the pull-out of article 1 from shelf 2, rent register 7 registers the rent information in the rent information area of the table, which corresponds to the number of shelf 2. After detector 3 detects the insertion of article 1 into shelf 2, commodity information reader 9 reads the commodity information of the inserted article through signal transmission unit. Return register 10 registers the return information in the rent information area of the table storing the read out commodity information. When the rent term expires, arrearage register 11 registers the arrearage information in the rent information area.

In the rent control system thus arranged, the presence or absence of articles in each shelf 2 is monitored by detector 3. The commodity information of articles 1 set in shelf 2, together with the shelf numbers and the rent information, is stored into the tables, respectively. When article 1 is pulled out from shelf 2, the rent information is stored into the rent information area of the table associated with the number of the shelf 2. When article 1 is set to shelf 2, detector 3 operates again and the commodity information is picked up by IC circuit 1a through signal transfer unit 2a. The return information is registered in the rent information area of the table in which the picked up commodity information is stored. When the rent term is over, the arrearage information is stored into the rent information area.

As described above, in the third embodiment, the IC circuit for storing the commodity information of the rent article is recorded in the cassette. The detector 3 is used for detecting the insertion of an article into the shelf. Therefore, the return and stock of articles can be controlled accurately.

Figure 13:
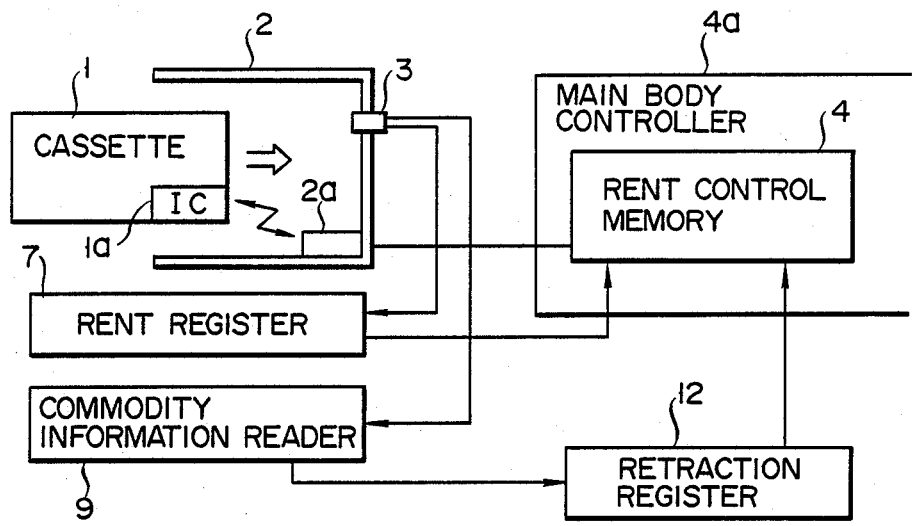
FIG. 13 is a block diagram showing a fourth embodiment of the invention.

A fourth embodiment of a rent control system according to this invention will be described referring to FIG. 13. IC circuit 1a stores the commodity information of each article. Articles 1 are individually set into a plurality of shelves 2. detector 3, which is provided in each shelf, detects the insertion of article 1 into shelf 2. Rent control memory 4 contains a plurality of tables. Each of the tables includes a commodity information area for storing the commodity information of article 1, a rent information area for storing the rent information, and a shelf number area for storing the number of the article-inserted shelf. Main body controller 4a executes of the read/write of the information for rent control memory 4. Signal transfer unit 2a is used to transfer data between IC circuit 1a and main body controller 4a when articles are set in shelf 2. After detector 3 detects that article 1 is pulled out from shelf 2, rent register 7 registers the rent information, containing the rent-time data, into the rent information area of the table, which corresponds to the number of the shelf 2. In response to the article insertion detected by detector 3, commodity information reader 9 reads the commodity information through signal transfer unit 2a of the inserted article. When the time elapsed from the rented time to the article insertion time is shorter than a predetermined retraction time, retraction register 12 retracts the rent information of that table. The rented time is stored in the rent information area of the table, which stores the commodity information read out by commodity information reader 9.

In the rent control system thus arranged, the presence or absence of the article 1 in shelf 1 is monitored. The commodity information of each article 1, together with the shelf number and the rent information, is stored into each table. When article 1 is pulled out for rent, the rent information including rent time is registered into the rent information area of the table associated with the number of the shelf from which article 1 has been pulled out. When article 1 is inserted in shelf 2, detector 3 operates again, and the commodity information stored in IC circuit 1d is read out through the signal connection unit. If the time elapsed from the rent time to the article insertion time is shorter than the retraction time, it is determined that article 1 has not been rented, and the rent information previously stored in the table is retracted.

As described above, in the fourth embodiment, the rent control memory is provided to store the rent information of each article. When the article is returned to the shelf within the retraction time, the rent information is automatically retracted. The rental shop can thus control the rental articles accurately.

Figure 14:
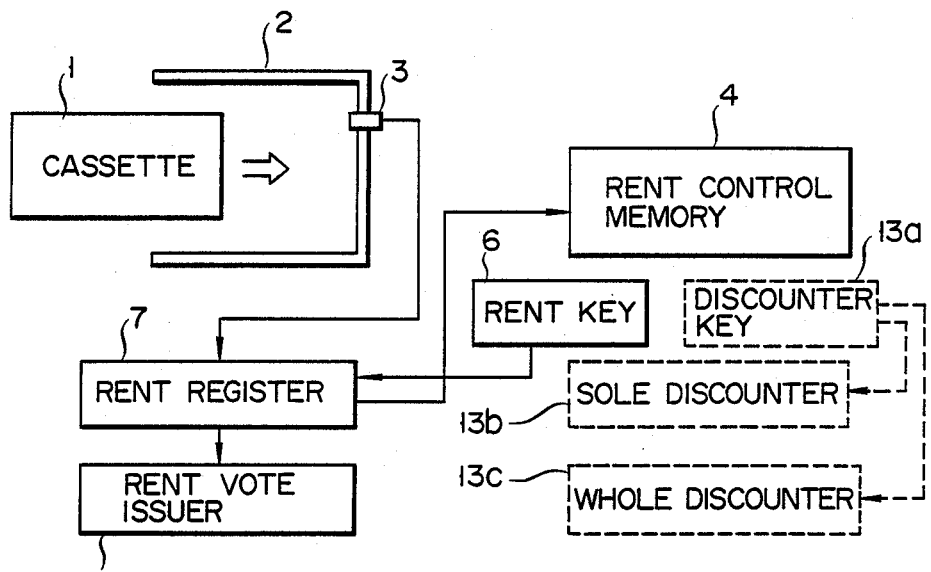
FIG. 14 is a block diagram showing a fifth embodiment of the invention.

Referring to FIG. 14, there is shown a fifth embodiment of a rent control system according to this invention. The rent control system comprises a plurality of shelves 2, detector 3, rent control memory 4, and rent key 6. Articles to be rented are individually set into shelf 2. Detector 3 detects the insertion of article 1 into shelf 2. Rent control memory 4 contains a plurality of tables, each commodity information area for storing the commodity information of article 1, rent information area for storing rent information, and shelf number area for storing the shelf number. After detector 3 detects that the article has been pulled from shelf 1, rent key 6 is operated, whereby rent register 7 registers the rent information into the rent information area of the table associated with the number of shelf 1. Rent slip issuer 7a prints the registered rent information on a rent slip.

In another embodiment of this invention, if discounter key 13a is operated before rent key 6, the discount information is registered in the rent information area of the table associated with the shelf number of the shelf from which article has been pulled out immediately before operation of discounter key 13a. This registration is performed solely by discounter 13b. When discounter key 13a is operated after rent key 6 is operated, the discount information is stored in the rent information areas of the tables associated with the numbers of the shelves from which articles have been pulled out immediately before rent key 6 is operated.

In the rent control system with such an arrangement, the presence or absence of the article in the shelf is monitored. The commodity information of each article, together with the shelf number and the rent information, is stored into each table. When the article is pulled out for rent, the rent information is registered in the rent information area of the table associated with the number of the shelf from which the article has been pulled. A rent slip, with the registered rent information printed on it, is issued.

When a plurality of articles is rented, discounter key 13a is pushed immediately after article 1 is pulled out from shelf 2. Then, the discount information for only the article 1 is registered. If discounter key 13a is pushed after all articles are pulled out from shelves 2 and rent key 6 is pushed, the discount information for all articles are registered.

As described above, in the fifth embodiment, a rent control memory for storing the rent information of each article is used. Further, a detector is used for detecting the setting of rental articles in the shelves. With this features, an accurate control of rental articles can be executed. Further, the discount operation of each article can be easily performed according to the rental conditions.

Referring to FIG. 15, there is shown a sixth embodiment of a rent control system according to this invention. The rent control system is comprised of IC circuit 1a, a plurality of shelves 2, detector 3, rent control memory 4, main body controller 4a, and signal transfer unit 2a. Articles to be rented are individually set into shelf 2. Detector 3 detects the insertion of article 1 into shelf 2. Rent control memory 4 contains a plurality of tables, each having commodity information area for storing the commodity information of article 1, rent information area for storing rent information, and shelf number area for storing the shelf number. Main body controller 4a executes the read/write operation on the rent control memory. Signal transfer unit 2a is provided between shelf 2 and article 1, in order to transfer data between IC circuit 1a and main body controller 4a when article 2 is inserted in the shelf. After detector 3 detects the pull-out of article from shelf 1, commodity information reader 9 reads the commodity information of the inserted article through signal transfer unit 2a. When working selector 14 selects the registering of the commodity information in rent control memory 4, the commodity information, read out by commodity information register 15, is stored into the commodity information area of the table associated with that table.

With such a rent control system, when the commodity information of a new article is stored into rent control memory 4, if article 1 is set in shelf 2, while working selector 14 selects the registering work, detector 3 operates so that the commodity information is read out from IC circuit 1a by signal transfer unit 2a. As a result, the commodity information is registered into the commodity information area of the table associated with that shelf 2.

As described above, in the sixth embodiment, the IC circuit for storing the commodity information is assembled into the rental article. When the article is inserted into shelf 2, the commodity information is automatically read and registered into the rent control memory. With this feature, the registration work for the memory can be much simplified, and erroneous registration is minimized.

Referring to FIG. 16, there is shown a seventh embodiment of a rent control system according to this invention. The rent control system comprises a plurality of shelves 2, detector 3, rent control memory 4, and main body controller 4a. Articles to be rented are individually set into shelf 2. Detector 3 detects the insertion of article 1 into shelf 2. Rent control memory 4 contains a plurality of tables, each having commodity information area for storing the commodity information of article 1, rent information area for storing rent information, and shelf number area for storing the shelf number. Main body controller 4a executes the read/write operation of the information in the rent control memory. When selector 14a selects the delete of the commodity information from rent control memory 4, and detector 3 detects the pull-out of that article 1 from shelf 2, rent-information printing outputter 7b prints out the rent information as stored in the table associated with the shelf number of the article pulled-out shelf 2. The rent information and commodity information are erased from the table associated with the shelf number of the article pulled-out shelf 2.

With the rent control system thus arranged, for deleting the commodity information and the rent information of the rented article 1, which are stored in the rent control memory 4, the delete work is selected by selector 14a, and the article associated with that information is pulled out from shelf 2. Then detector 3 operates so that the rent information stored in the table associated with that shelf is printed out. The commodity information of that article and the printed rent information are both erased.

As described above, in the seventh embodiment, if the work mode is set, and an article is pulled out from shelf, a predetermined delete work including the rent information printing is automatically executed. Thus, the rent information of the old article can be deleted, while preserving the effective rent information. Therefore, an accurate rent control is realized.

Referring to FIG. 17, there is shown an eighth embodiment of a rent control system according to this invention. The rent control system comprises IC circuit 1a, a plurality of shelves 2, detector 3, rent control memory 4, main body controller 4a, and signal transfer unit 2a. IC circuit 1a stores the commodity information of article 1. Articles to be rented are individually set into shelf 2. Detector 3 detects the insertion of article 1 into shelf 2. Rent control memory 4 contains a plurality of tables, each having at least commodity information area for storing the commodity information of article 1, and shelf number area for storing the shelf number. Main body controller 4a executes the read/write operation of the information for the rent control memory. Signal transfer unit 2a is provided between shelf 2 and article 1 in order to transfer data between IC circuit 1a and main body controller 4a when article 2 is inserted in the shelf. In response to the detection by detector 3 of pulling out article 1 from shelf 2, clear section 17a clears the shelf number in the shelf number area of the table associated with the shelf number of the article pulled-out shelf. In response to the detection by detector 3 of inserting article 1 into shelf 2, commodity information reader 9 reads the commodity information of the inserted article, through the signal transfer unit 2a. Search section 17b searches for the commodity information areas of the tables, by using the commodity information as read out. Shelf No. set section 17c sets the number of the inserted shelf in the shelf number area of the searched table.

In the rent control system thus arranged, the commodity information of article being set into shelf 2, together with the shelf number of that shelf, is stored into each table of rent control memory 4. In response to the pull-out article 1 from shelf 2, detector 3 operates, erasing the shelf number of that shelf in rent control memory 4. This indicates that the article is rented. When returned article 1 is inserted into a shelf with no article, detector 3 operates, and signal transfer unit 2a reads out the commodity information from the IC circuit 1a of the inserted article 1. In accordance with the commodity information, each table of rent control memory 4 is searched. Upon searching of that table, the shelf number of shelf 2 is stored into the shelf number area of the table. In this way, the insertion of article into the shelf is stored.

As described above, since the IC circuit for storing the commodity information is assembled into the article, if the returned article is set into any shelf, the return information of the article can be grasped accurately. Therefore, exact and simple rent control of articles is realized.

Referring to FIG. 18, there is shown a ninth embodiment of a rent terminal-end apparatus according to this invention. The rent control system comprises a plurality of shelves 2, detector 3, transmit data memory 4A, and main body controller 4B. Articles to be rented are set into shelf 2 individually. Detector 3 detects the insertion of article 1 into shelf 2. Memory 4A temporarily stores the data to be transferred to an external host computer, through a transmission line. Main body controller 4B executes the read/write operation of data for the memory 4A. In response to the detection, by detector, 4 of pulling out article 1 from shelf 2, the rent information of the inserted article is stored into transmit data memory 4A. In response to the detection by detector 4 of inserting an article to the shelf, the return information of the inserted article is stored into transmit data memory 4A. This apparatus is further provided with clock circuit 18A for clocking current time, power supply 18B for supplying drive voltage to main body controller 4B, and power interruption detector 18c for detecting drop of the drive voltage below a predetermined voltage. In response to the drive voltage start detected at power supply 18B, power on time register 18D stores the present time read out from clock circuit 18A, as the power-on time, into transmit data memory 4A. In response to the power interrupt detection by power interrupt detector 18C, power-off time register 18E stores the present time read out from clock circuit 18A, as the power off time, into transmit data memory 4A.

In the rent terminal-end apparatus, when an article is pulled out from a shelf, detector 3 operates, so that the rent information of the pulled-out article is stored into transmit data memory 4A. When the article is inserted into the shelf, detector 4 operates so that the return information of the inserted article is stored into the memory 4A. When the power supply is turned on, the power-on time is stored into the memory 4A. When it is interrupted, power interrupt detector 18C operates, so that the power-off time is stored into the memory 4A. Therefore, if the power supply is always turned on, when the power is intentionally turned off, it is recorded.

As described above, the return information and the power off information as well are stored. The accurate rent control can be attained, eliminating erroneous operation of the apparatus.

As recalled, a cassette control rack includes a plurality of shelves 2. Each shelf 22 comprises a pair of upper and lower members arranged in parallel (FIGS. 1 to 3). Cassettes are slidably set between first and second guide grooves which are formed on the surfaces of them facing each other. A stopper is provided for limiting the insertion of the cassette as inserted along the guide grooves. A stepped portion for preventing the cassette from slipping off is provided upwardly at the cassette entrance portion of the second guide groove of the lower member. A detector is provided and operates when the cassette is inserted and reaches the stopper.

In use, a cassette is slidably inserted into the shelf till it reaches the stopper. When the cassette reaches the stopper, the detector operates. When the cassette is inserted, passing the stepped portion into the shelf, it can be stably held in the shelf against vibration of the rack, unless it is raised.

As described above, the cassette slip-off preventing means is provided in the shelf. The detector for checking if the cassette is stably set in the shelf is used. Therefore, the renting of cassettes can be controlled reliably.

What is claimed is:

1. A rent control system for controlling the rent and return of cassettes, said system comprising:

a plurality of cassettes to be controlled, each internally containing an article, and being provided with IC circuit means for storing commodity information concerning said article, and signal output means for transferring said commodity information stored in said IC circuit means to outside;

a plurality of shelf means for respectively accommodating a plurality of said cassettes to be controlled; and control means connected with said plurality of shelf means, and having a plurality of signal input means for receiving signals from said signal output means of said cassettes, and memory means being coupled with said control means so as to store signals from said plurality of signal input means;

wherein said control means includes detectors provided in said respective shelves, each detecting the cassette insertion into the shelf; a rent control memory including a plurality of tables respectively corresponding to said cassettes, said tables each consisting of a commodity information area for storing commodity information, a rent information area for storing rent information, and a shelf number area for storing a shelf number; a timer for measuring time from the instant that said detector detects the pull-out of the cassette from the shelf; rent registering means for registering rent information into the rent information area of the table corresponding to the number of the shelf from which said cassette is pulled out, in response to a rent key operation which has been done before the time measures a predetermined allowance time; status pending registering means for registering status pending information into the rent information area of the table corresponding to the number of the shelf from which said cassette has been pulled out, in response to the end of the allowance time measured by said time.

2. The rent control system according to claim 1, wherein said control means includes detectors provided in said respective shelves, each detecting the cassette insertion into the shelf; a rent control memory including a plurality of tables respectively corresponding to said cassettes, said tables each consisting of a commodity information area for storing commodity information, a rent information area for storing rent information, and a shelf number area for storing a shelf number; main body controller for performing the read and write of information for the rent control memory; signal transfer means provided between said shelf and said cassette, and for performing data transfer to and from said IC circuit and said main body controller when said cassette is set in said shelf; rent registering means for registering, after said detector detects the pull-out of the cassette from the shelf, the rent information into the rent information area of the table corresponding to the shelf number of the cassette pulled-out shelf; commodity information reading means for reading out, after said detector detects the cassette insertion into the shelf, the commodity information of the inserted cassette via said signal transfer means; return registering means for registering the return information into the rent information area of the table, which stores the read out commodity information; and arrears registering means for registering the arrears information into said rent information area, when the rent term from said rent registration to said return registration exceeds a specified rent term.

3. The rent control system according to claim 1, wherein said control means includes detectors provided in said respective shelves, each detecting the cassette insertion into the shelf; a rent control memory including a plurality of tables respectively corresponding to said cassettes, said tables each consisting of a commodity information area for storing commodity information, a rent information area for storing rent information, and a shelf number area for storing a shelf number; main body controller for performing the read and write of information for the rent control memory; signal transfer means provided between said shelf and said cassette, and for performing data transfer to and from said IC circuit and said main body controller when said cassette is set in said shelf; rent registering means for registering, after said detector detects the pull-out of the cassette from the shelf, the rent information including rent time into the rent information area of the table corresponding to the number of the shelf from which said article has been pulled out; commodity information reading means for reading out, in response to the detection by the detector of cassette insertion into the shelf, the commodity information of the inserted cassette via said signal transfer means; and retraction registering means for retracting the rent information of the table storing the read out commodity information, if the time elapsed from the rent time when the read out commodity information is stored into the rent information area of said table until the insertion time of the cassette, is shorter than a predetermined during of said allowance time.

4. The rent control system according to claim 1, wherein said control means includes detectors provided in said respective shelves, each detecting the cassette insertion into the shelf; a rent control memory including a plurality of tables respectively corresponding to said cassettes, said tables each consisting of a commodity information area for storing commodity information, a rent information area for storing rent information, and a shelf number area for storing a shelf number; rent registering means for registering, in response to a rent key operation performed after said detector has detected the pulling of the cassette from the shelf, the rent information into the rent information area of the table associated with the shelf number of the cassette pulled-out shelf; and rent slip issuing means for printing said registered rent information on a rent slip.

5. The rent control system according to claim 1, wherein said control means includes detectors provided in said respective shelves, each detecting the cassette insertion into the shelf; a rent control memory including a plurality of tables respectively corresponding to said cassettes, said tables each consisting of a commodity information area for storing commodity information, a rent information area for storing rent information, and a shelf number area for storing a shelf number; rent registering means for registering, in response to the rent key operation performed after said detector has detected the pulling of the cassette from the shelf, the rent information into the rent information area of the table associated with the shelf number of the cassette pulled-out shelf; and rent slip issuing means for printing said registered rent information on a rent slip; single discounting means for registering, in response to a discount key operation performed before a rent key is operated, discount information into the rent information area of the table corresponding to the number of the shelf from which the article has been pulled out just before the discount key is operated, and whole discounting means for registering, in response to the discount key operation after said rent key is operated, discount information into the respective rent information areas of the tables associated with the shelf numbers of all the shelves from which the cassettes have been pulled out before the rent key is operated.

6. The rent control system according to claim 1, wherein said control means includes detectors provided in said respective shelves, each detecting the cassette insertion into the shelf; a rent control memory including a plurality of tables respectively corresponding to said cassettes, said tables each consisting of a commodity information area for storing commodity information, a rent information area for storing rent information, and a shelf number area for storing a shelf number; main body controller for performing the read and write of information for the rent control memory; signal transfer means provided between said shelf and said cassette, for performing data transfer to and from said IC circuit and said main body controller when said cassette is set in said shelf; commodity information reading means for reading out, when said detector detects the insertion of the article into the shelf, the commodity information of the inserted article via said signal transfer means; working selector means having a registering work mode for registering commodity information into said rent control memory; commodity information registering means for storing said read out commodity information into the commodity information area of the corresponding table provided in the rent control memory, when the registering work mode is set in the working selector means.

7. The rent control system according to claim 1, wherein said control means includes detectors provided in said respective shelves, each detecting the insertion of the cassette into the shelf; a rent control memory including a plurality of tables respectively corresponding to said cassettes, said tables each consisting of a commodity information area for storing commodity information, a rent information area for storing rent information, and a shelf number area for storing a shelf number; main body controller for performing the read and write of information for the rent control memory; working selector means having delete work mode for deleting the commodity information stored in said rent control memory; rent information printing means for printing the rent information stored in the table associated with the number of shelf from which said article has been pulled out when the delete work mode is set in the working selector means, when said detector detects the pull-out of said cassette from the shelf; commodity information delete means for clearing the rent information and commodity information in the table with the number of the shelf from which said article has been pulled out.

8. The rent control system according to claim 1, wherein said control means includes detectors provided in said respective shelves, each detecting the cassette insertion into the shelf; a rent control memory including a plurality of tables respectively corresponding to said cassettes, said tables each consisting of at least a commodity information area for storing commodity information and a shelf number area for storing a shelf number; main body controller for performing the read and write of information for the rent control memory; signal transfer means provided between said shelf and said cassette, and for performing data transfer to and from said IC circuit and said main body controller when said cassette is set in said shelf number clear means for clearing, when it is detected that said cassette is pulled from the shelf, the shelf number stored in the shelf number area of the table associated with the number of the shelf from which said article has been pulled out; commodity information reading means for reading out, when the detector detects the insertion of the cassette into the shelf, the commodity information of the inserted cassette via said signal transfer means; table search means for searching for the commodity information areas of said tables by using the read out commodity information; and shelf number setting means for storing the number of the shelf into which said cassette has been inserted, into the shelf number area searched by said table search means.

9. The rent control system according to claim 1, wherein said plurality of shelf means constitute rack means having each a pair of upper and lower members arranged in parallel whose surfaces facing each other have first and second guide grooves along which cassettes are slidably guided; at least one stopper which limits the insertion of cassette when it is inserted along said guide grooves; means for preventing the cassette from slipping off the guide grooves, said means being a stepped portion formed upwardly at the entrance portion for cassette insertion of said second guide groove; and means for detecting that the cassette reaches said at least one stopper.

10. A rent control system for controlling the rent and return of cassettes, said system comprising:
  a plurality of cassettes to be controlled, each internally containing an article, and being provided with IC circuit means for storing commodity information concerning said article, and signal output means for transferring said commodity information stored in said IC circuit means to outside;
  a plurality of shelf means for respectively accommodating a plurality of said cassettes to be controlled; and
  control means connected with said plurality of shelf means, and having a plurality of signal input means for receiving signals from said signal output means of said cassettes, and memory means being coupled with said control means so as to store signals from said plurality of signal input means;
  wherein said control means includes detectors provided in said respective shelves, each detecting the cassette insertion into the shelf; a rent control memory including a plurality of tables respectively corresponding to said cassettes, said tables each consisting of a commodity information area for storing commodity information, a rent information area for storing rent information, and a shelf number area for storing a shelf number; main body controller for performing the read and write of information for the rent control memory; signal transfer means provided between said shelf and said cassette, and for performing data transfer to and from said IC circuit and said main body controller when said cassette is set in said shelf; rent registering means for registering, after said detector detects the pull-out of the cassette from the shelf, the rent information into the rent information area of the table corresponding to the shelf number of the cassette pulled-out shelf; commodity information reading means for reading out, after said detector detects the cassette insertion into the shelf, the commodity information of the inserted cassette via said signal transfer means; return registering means for registering the return information into the rent information area of the table, which stores the read out commodity information; and arrears registering means for registering the arrears information into said rent information area, when the rent term from said rent registration to said return registration exceeds a specified rent term.

11. A rent control system for controlling the rent and return of cassettes, said system comprising:
a plurality of cassettes to be controlled, each internally containing an article, and being provided with IC circuit means for storing commodity information concerning said article, and signal output means for transferring said commodity information stored in said IC circuit means to outside;
a plurality of shelf means for respectively accommodating a plurality of said cassettes to be controlled; and
control means connected with said plurality of shelf means, and having a plurality of signal input means for receiving signals from said signal output means of said cassettes, and memory means being coupled with said control means so as to store signals from said plurality of signal input means;
wherein said control means includes detectors provided in said respective shelves, each detecting the cassette insertion into the shelf; a rent control memory including a plurality of tables respectively corresponding to said cassettes, said tables each consisting of a commodity information area for storing commodity information, a rent information area for storing rent information, and a shelf number area for storing a shelf number; main body controller for performing the read and write of information for the rent control memory; signal transfer means provided between said shelf and said cassette, and for performing data transfer to and from said IC circuit and said main body controller when said cassette is set in said shelf; rent registering means for registering, after said detector detects the pull-out of the cassette from the shelf, the rent information including rent time into the rent information area of the table corresponding to the number of the shelf from which said article has been pulled out; commodity information reading means for reading out, in response to the detection by the detector of cassette insertion into the shelf, the commodity information of the inserted cassette via said signal transfer means; and retraction registering means for retracting the rent information of the table storing the read out commodity information, if the time elapsed from the rent time when the read out commodity information is stored into the rent information area of said table until the insertion time of the cassette, is shorter than a predetermined retractable allowance time.

12. A rent control system for controlling the rent and return of cassettes, said system comprising:
a plurality of cassettes to be controlled, each internally containing an article, and being provided with IC circuit means for storing commodity information concerning said article, and signal output means for transferring said commodity information stored in said IC circuit means to outside;
a plurality of shelf means for respectively accommodating a plurality of said cassettes to be controlled; and
control means connected with said plurality of shelf means, and having a plurality of signal input means for receiving signals from said signal output means of said cassettes, and memory means being coupled with said control means so as to store signals from said plurality of signal input means;
wherein said control means includes detectors provided in said respective shelves, each detecting the cassette insertion into the shelf; a rent control memory including a plurality of tables respectively corresponding to said cassettes, said tables each consisting of a commodity information area for storing commodity information, a rent information area for storing rent information, and a shelf number area for storing a shelf number; rent registering means for registering, in response to a rent key operation performed after said detector has detected the pulling of the cassette from the shelf, the rent information into the rent information area of the table associated with the shelf number of the cassette pulled-out shelf; and rent slip issuing means for printing said registered rent information on a rent slip.

13. A rent control system for controlling the rent and return of cassettes, said system comprising:
a plurality of cassettes to be controlled, each internally containing an article, and being provided with IC circuit means for storing commodity information concerning said article, and signal output means for transferring said commodity information stored in said IC circuit means to outside;
a plurality of shelf means for respectively accommodating a plurality of said cassettes to be controlled; and
control means connected with said plurality of shelf means, and having a plurality of signal input means for receiving signals from said signal output means of said cassettes, and memory means being coupled with said control means so as to store signals from said plurality of signal input means;
wherein said control means includes detectors provided in said respective shelves, each detecting the cassette insertion into the shelf; a rent control memory including a plurality of tables respectively corresponding to said cassettes, said tables each consisting of a commodity information area for storing commodity information, a rent information area for storing rent information, and a shelf number area for storing a shelf number; rent registering means for registering, in response to the rent key operation performed after said detector has detected the pulling of the cassette from the shelf, the rent information into the rent information area of the table associated with the shelf number of the cassette pulled-out shelf; and rent slip issuing means for printing said registered rent information on a rent slip; single discounting means for registering, in response to a discount key operation performed before a rent key is operated, discount information into the rent information area of the table corresponding to the number of the shelf from which the article has been pulled out just before the discount key is operated, and whole discounting means for registering, in response to the discount key operation after said rent key is operated, discount information into the respective rent information areas of the tables associated with the shelf number of all the shelves from which the cassettes have been pulled out before the rent key is operated.

14. A rent control system for controlling the rent and return of cassettes, said system comprising:
- a plurality of cassettes to be controlled, each internally containing an article, and being provided with IC circuit means for storing commodity information concerning said article, and signal output means for transferring said commodity information stored in said IC circuit means to outside;
- a plurality of shelf means for respectively accommodating a plurality of said cassettes to be controlled; and
- control means connected with said plurality of shelf means, and having a plurality of signal input means for receiving signals from said signal output means of said cassettes, and memory means being coupled with said control means so as to store signals from said plurality of signal input means;
- wherein said control means includes detectors provided in said respective shelves, each detecting the cassette insertion into the shelf; a rent control memory including a plurality of tables respectively corresponding to said cassettes, said tables each consisting of a commodity information area for storing commodity information, a rent information area for storing rent information, and a shelf number area for storing a shelf number; main body controller for performing the read and write of information for the rent control memory; signal transfer means provided between said shelf and said cassette, for performing data transfer to and from said IC circuit and said main body controller when said cassette is set in said shelf; commodity information reading means for reading out, when said detector detects the insertion of the article into the shelf, the commodity information of the inserted article via said signal transfer means; working selector means having a registering work mode for registering commodity information into said rent control memory; commodity information registering means for storing said read out commodity information into the commodity information area of the corresponding table provided in the rent control memory, when the registering work mode is set in the working selector means.

15. A rent control system for controlling the rent and return of cassettes, said system comprising:
- a plurality of cassettes to be controlled, each internally containing an article, and being provided with IC circuit means for storing commodity information concerning said article, and signal output means for transferring said commodity information stored in said IC circuit means to outside;
- a plurality of shelf means for respectively accommodating a plurality of said cassettes to be controlled; and
- control means connected with said plurality of shelf means, and having a plurality of signal input means for receiving signals from said signal output means of said cassettes, and memory means being coupled with said control means so as to store signals from said plurality of signal input means;
- wherein said control means includes detectors provided in said respective shelves, each detecting the insertion of the cassette into the shelf; a rent control memory including a plurality of tables respectively corresponding to said cassettes, said tables each consisting of a commodity information area for storing commodity information, a rent information area for storing rent information, and a shelf number area for storing a shelf number; main body controller for performing the read and write of information for the rent control memory; working selector means having delete work mode for deleting the commodity information stored in said rent control memory; rent information printing means for printing the rent information stored in the table associated with the number of shelf from which said article has been pulled out when the delete work mode is set in the working selector means, when said detector detect the pull-out of said cassette from the shelf; commodity information delete means for clearing the rent information and commodity information in the table with the number of the shelf from which said article has been pulled out.

16. A rent control system for controlling the rent and return of cassettes, said system comprising:
- a plurality of cassettes to be controlled, each internally containing an article, and being provided with IC circuit means for storing commodity information concerning said article, and signal output means for transferring said commodity information stored in said IC circuit means to outside;
- a plurality of shelf means for respectively accommodating a plurality of said cassettes to be controlled; and
- control means connected with said plurality of shelf means, and having a plurality of signal input means for receiving signals from said signal output means of said cassettes, and memory means being coupled with said control means so as to store signals from said plurality of signal input means;
- wherein said control means includes detectors provided in said respective shelves, each detecting the cassette insertion into the shelf; a rent control memory including a plurality of tables respectively corresponding to said cassettes, said tables each consisting of at least a commodity information area for storing commodity information and a shelf number area for storing a shelf number; main body controller for performing the read and write of information for the rent control memory; signal transfer means provided between said shelf and said cassette, and for performing data transfer to and from said IC circuit and said main body controller when said cassette is set in said shelf; shelf number clear means for clearing, when it is detected that said cassette is pulled from the shelf, the shelf number stored in the shelf number area of the table associated with the number of the shelf from which said article has been pulled out; commodity information reading means for reading out, when the detector detects the insertion of the cassette into the shelf, the commodity information of the inserted cassette via said signal transfer means; table search means for searching for the commodity information areas of said tables by using the read out commodity information; and shelf number setting means for storing the number of the shelf into which said cassette has been inserted, into the shelf number area searched by said table search means.

17. A rent control system for controlling the rent and return of cassettes, said system comprising:
- a plurality of cassettes to be controlled, each internally containing an article, and being provided with IC circuit means for storing commodity information concerning said article, and signal output means for transferring said commodity information stored in said IC circuit means to outside;

a plurality of shelf means for respectively accommodating a plurality of said cassettes to be controlled; and control means connected with said plurality of shelf means, and having a plurality of signal input means for receiving signals from said signal output means of said cassettes, and memory means being coupled with said control means so as to store signals from said plurality of signal input means;

wherein said plurality of shelf means constitute rack means having each a pair of upper and lower members arranged in parallel whose surfaces facing each other have first and second guide grooves along which cassettes are slidably guided; at least one stopper which limits the insertion of cassette when it is inserted along said guide grooves; means for preventing the cassette from slipping off the guide grooves, said means being a stepped portion formed upwardly at the entrance portion for cassette insertion of said second guide groove; and means for detecting that the cassette reaches said at least one stopper.

* * * * *